(12) United States Patent
Ellis et al.

(10) Patent No.: US 11,964,578 B2
(45) Date of Patent: *Apr. 23, 2024

(54) ELECTRIC VEHICLE CHARGING APPARATUS, SYSTEM AND METHODS

(71) Applicant: SparkCharge, Inc., Somerville, MA (US)

(72) Inventors: Christopher R. Ellis, Melrose, MA (US); Richard Whitney, Somerville, MA (US)

(73) Assignee: SPARKCHARGE, INC., Somerville, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/822,961

(22) Filed: Aug. 29, 2022

(65) Prior Publication Data
US 2022/0410739 A1  Dec. 29, 2022

Related U.S. Application Data

(63) Continuation of application No. 17/006,168, filed on Aug. 28, 2020, now Pat. No. 11,453,301.
(Continued)

(51) Int. Cl.
*B60L 53/20* (2019.01)
*B60L 53/66* (2019.01)
*H02J 7/00* (2006.01)

(52) U.S. Cl.
CPC .............. *B60L 53/20* (2019.02); *B60L 53/66* (2019.02); *H02J 7/0029* (2013.01); *B60L 2210/10* (2013.01)

(58) Field of Classification Search
CPC ...... B60L 53/20; B60L 53/66; B60L 2210/10; B60L 3/0046; B60L 2270/20;
(Continued)

(56) References Cited

U.S. PATENT DOCUMENTS 3,781,637 A  12/1973 Potter
4,800,329 A   1/1989 Masaki
(Continued)

FOREIGN PATENT DOCUMENTS

EP  2624427 A2  8/2013
FR  3026243 A1  3/2016
(Continued)

OTHER PUBLICATIONS

"A Comprehensive Study of Key Electric Vehicle (EV) Components, Technologies, Challenges, Impacts, and Future Direction of Development", by Un-Noor et al., Energies, Aug. 17, 2017.
(Continued)

*Primary Examiner* — Stacy Whitmore
(74) *Attorney, Agent, or Firm* — Heslin Rothenberg Farley & Mesiti P.C.; Victor A. Cardona, Esq.

(57) ABSTRACT

An electric vehicle charging system includes an interleaved DC-DC control system configured to facilitate providing electric charge to an electric vehicle battery and includes a controller communicatively coupled to the interleaved DC-DC control system. The interleaved DC-DC control system includes an inrush current limiting circuit, three parallel boost converters that are each configured to operate in a discrete phase, and unidirectional current circuitry. The controller includes electronic control circuitry configured to control the interleaved DC-DC control system and vehicle communication circuitry configured to establish charging protocols between the interleaved DC-DC control system and the electric vehicle battery.

20 Claims, 4 Drawing Sheets

Related U.S. Application Data

(60) Provisional application No. 62/892,800, filed on Aug. 28, 2019.

(58) Field of Classification Search
CPC ...... H02J 7/0029; H02J 2207/20; H02J 7/342; Y02T 10/70; Y02T 10/7072; Y02T 10/72; Y02T 10/92; Y02T 90/12; Y02T 90/14; Y02T 90/16

See application file for complete search history.

(56) References Cited

U.S. PATENT DOCUMENTS

| | | | |
|---|---|---|---|
| 5,430,364 | A | 7/1995 | Gibson |
| 5,563,781 | A | 10/1996 | Clauter et al. |
| 5,572,416 | A | 11/1996 | Jacobs et al. |
| 8,378,623 | B2 | 2/2013 | Kusch et al. |
| 8,829,722 | B2 | 9/2014 | Kusch et al. |
| 9,242,567 | B2 | 1/2016 | Kim et al. |
| 9,337,721 | B2 | 5/2016 | Park et al. |
| 9,428,122 | B2 | 8/2016 | Lee |
| 9,620,974 | B2 | 4/2017 | King et al. |
| 9,627,908 | B2 | 4/2017 | Kaminsky et al. |
| 9,849,806 | B1 | 12/2017 | Xu et al. |
| 9,931,951 | B2 | 4/2018 | Khaligh et al. |
| 10,899,231 | B2 | 1/2021 | Lu et al. |
| 11,196,349 | B2 | 12/2021 | Bouchez |
| 11,453,301 | B2 * | 9/2022 | Ellis ..................... H02J 7/0029 |
| 2012/0163035 | A1 | 6/2012 | Song et al. |
| 2013/0134924 | A1 | 5/2013 | Kanakasabai |
| 2014/0145677 | A1 | 5/2014 | King et al. |
| 2015/0263694 | A1 | 9/2015 | Sun |
| 2016/0329811 | A1 | 11/2016 | Du et al. |
| 2017/0368952 | A1 | 12/2017 | Seong et al. |
| 2019/0210475 | A1 | 7/2019 | Pfeilschifler et al. |
| 2019/0288539 | A1 | 9/2019 | Vela Garcia |
| 2019/0366850 | A1 | 12/2019 | Ge et al. |
| 2020/0044572 | A1 | 2/2020 | Bouchez |
| 2020/0290461 | A1 | 9/2020 | Lu et al. |
| 2021/0061113 | A1 | 3/2021 | Ellis et al. |

FOREIGN PATENT DOCUMENTS

| | | |
|---|---|---|
| JP | H0226223 A | 1/1990 |
| KR | 20120061660 A | 6/2012 |
| WO | WO2018055702 A1 | 3/2018 |
| WO | 2018126393 A1 | 7/2018 |
| WO | 2018227307 A1 | 12/2018 |
| WO | 2018233956 A1 | 12/2018 |

OTHER PUBLICATIONS

"A comprehensive overview of the dc-dc converter-based battery charge balancing methods in electric vehicles", by Turksoy et al., Renewable and Sustainable Energy Reviews, dated Nov. 2020.

"High Power Li-Ion Battery Charger for Electric Vehicle", by Kuperman et al., IEEE, dated Jun. 13, 2011.

"Bidirectional DC-DC Converter Reference Disign for 12-V/48-V Automotive Systems", by Texas Instruments Incorporated, TI Designs, dated Mar. 1, 2018.

"Electric Vehicles Charging Technology Review and Optimal Size Estimation", by Brenna et al., Journal of Electrical Engineering & Technology, dated Sep. 17, 2020.

"Fixed Switching Frequency Digital Sliding-Mode Control of DC-DC Power Supplies Loaded by Constant Power Loads with Inrush Current Limitation Capability", by El Aroudi et al., Energies, dated Mar. 19, 2019.

"SiC-MOSFET and Si-IGBT-Based dc-dc Interleaved Converters for EV Chargers: Approach for Efficiency Comparison with Minimum Switching Losses Based on Complete Parasitic Modeling", by Loncarski et al., Energies, dated Sep. 3, 2020.

International Search Report and Written Opinion dated Jan. 8, 2021.

Ex Parte Quayle Notice (U.S. Appl. No. 17/006,168) dated Mar. 9, 2022, 14 pp.

Mouli Gautham Ram Chandra, et al., "Future of electric vehicle charging", 2017 International Symposium on Power Electronics (EE), IEEE, Oct. 19, 2017 (Oct. 19, 2017), 8 pgs.

* cited by examiner

ELECTRIC VEHICLE CHARGING APPARATUS, SYSTEM AND METHODS

CROSS REFERENCE TO RELATED APPLICATION

This application is a continuation of U.S. patent application Ser. No. 17/006,168 filed on Aug. 28, 2020, which claims priority to U.S. Provisional Application Ser. No. 62/892,800, filed on Aug. 28, 2019 entitled "3-PHASE INTERLEAVED 20 kW DC-DC EV CHARGER", the entire disclosures of which are hereby incorporated herein by reference.

TECHNICAL FIELD

One or more aspects broadly relate electric vehicle charging and more specifically to a DC-DC electric vehicle charging apparatus, system, and related methods.

BACKGROUND

Rechargeable batteries have been used for electrical energy storage in a wide range of applications including their use in vehicles, power tools, lap-top computers, mobile phones, two-way radios, lights, and uninterruptible power supplies. Vehicles that use rechargeable batteries can include automobiles, battery electric vehicles, hybrid electric vehicles, boats, golf carts, and aircraft. Electric chargers and methods of charging have been developed and used for charging these rechargeable batteries. Stationary chargers use power from the electric power grid have also been widely used to charge the rechargeable batteries. For instance, electric chargers have been developed that use alternating current, and transform the alternating current from one voltage to another using one or more wire-wound transformers, which can lead to some chargers being bulky or heavy.

A need exists to reduce the size and mass of chargers to enable a charging apparatus to be easily transportable with the electric vehicle. Further, electric vehicle chargers need to be reliable, safe, easy to use, and efficient.

SUMMARY

An electric vehicle charging system includes an interleaved DC-DC control system configured to facilitate providing electric charge to an electric vehicle battery from an energy storage device. The interleaved DC-DC control system includes an inrush current limiting circuit and three parallel boost converters, where each boost converter of the three parallel boost converters is configured to operate in a discrete phase, and where the three parallel boost converters are communicatively coupled to the inrush current limiting circuit. Further, the interleaved DC-DC control system includes unidirectional current circuitry communicatively coupled to the three parallel boost converters. The electric vehicle charging system also includes a controller communicatively coupled to the interleaved DC-DC control system. The controller includes electronic control circuitry configured to control the interleaved DC-DC control system as well as vehicle communication circuitry configured to establish charging protocols between the interleaved DC-DC control system and the electric vehicle battery, where the vehicle communication circuitry is communicatively coupled to the electric control circuitry.

Further, a method of manufacturing an electric vehicle charging system is provided. The method includes using electroplating to form an interleaved DC-DC control system that includes magnetic core inductors, a heatsink, and multistrand wire, where the electroplating produces a single printed circuit board that includes three parallel boost converters. Further, the method includes stacking the interleaved DC-DC control system on an energy storage device, where the stacking aligns the interleaved DC-DC control system such that the single printed circuit board is a same length and width as the energy storage device.

Further, a method of charging an electric vehicle battery is provided. The method includes receiving, by an interleaved DC-DC control system, an electrical power input from an energy storage device, the electrical power input being received at an inrush current limiting circuit of the interleaved DC-DC control system, where the inrush current limiting circuit includes multiple switching components. A controller communicatively coupled to the interleaved DC-DC control system switches the multiple switching components on and off during an inrush current phase so that an electrical current flows continuously to three parallel boost converters of the interleaved DC-DC control system. The three parallel boost converters boost an input voltage of the electrical power input to a higher voltage of the electric vehicle battery. An electromagnetic interference filter of the interleaved DC-DC control system filters out noise from the electrical power input. Unidirectional current circuitry transmits the electrical power input to the electric vehicle battery.

Additional features and advantages are realized through the concepts described herein.

BRIEF DESCRIPTION OF THE DRAWINGS

Aspects described herein are particularly pointed out and distinctly claimed as examples in the claims at the conclusion of the specification. The foregoing and other objects, features, and advantages of the disclosure are apparent from the following detailed description taken in conjunction with the accompanying drawings in which:

DETAILED DESCRIPTION

Described herein is an electric vehicle (EV) charging system for charging an EV battery. The EV charging system may provide unidirectional flow of an electric charge using direct current to direct current (DC-DC) conversion, where the electric input is received from an energy storage device and transmitted, via the EV charging system, to the EV battery. According to various embodiments, the EV charging system may provide an output of a constant current (CC) or constant voltage (CV) across a wide DC voltage output range to an EV battery. The direct current (DC) voltage output range can be boosted, for example, via an interleaved DC-DC control system to as much as six times the input voltage in order to transfer the lower battery voltage from the energy storage device to the higher vehicle battery voltage. Advantageously, according to aspects described herein, efficiency of the EV charging system may include a high peak efficiency of over 99%.

Figure 1:
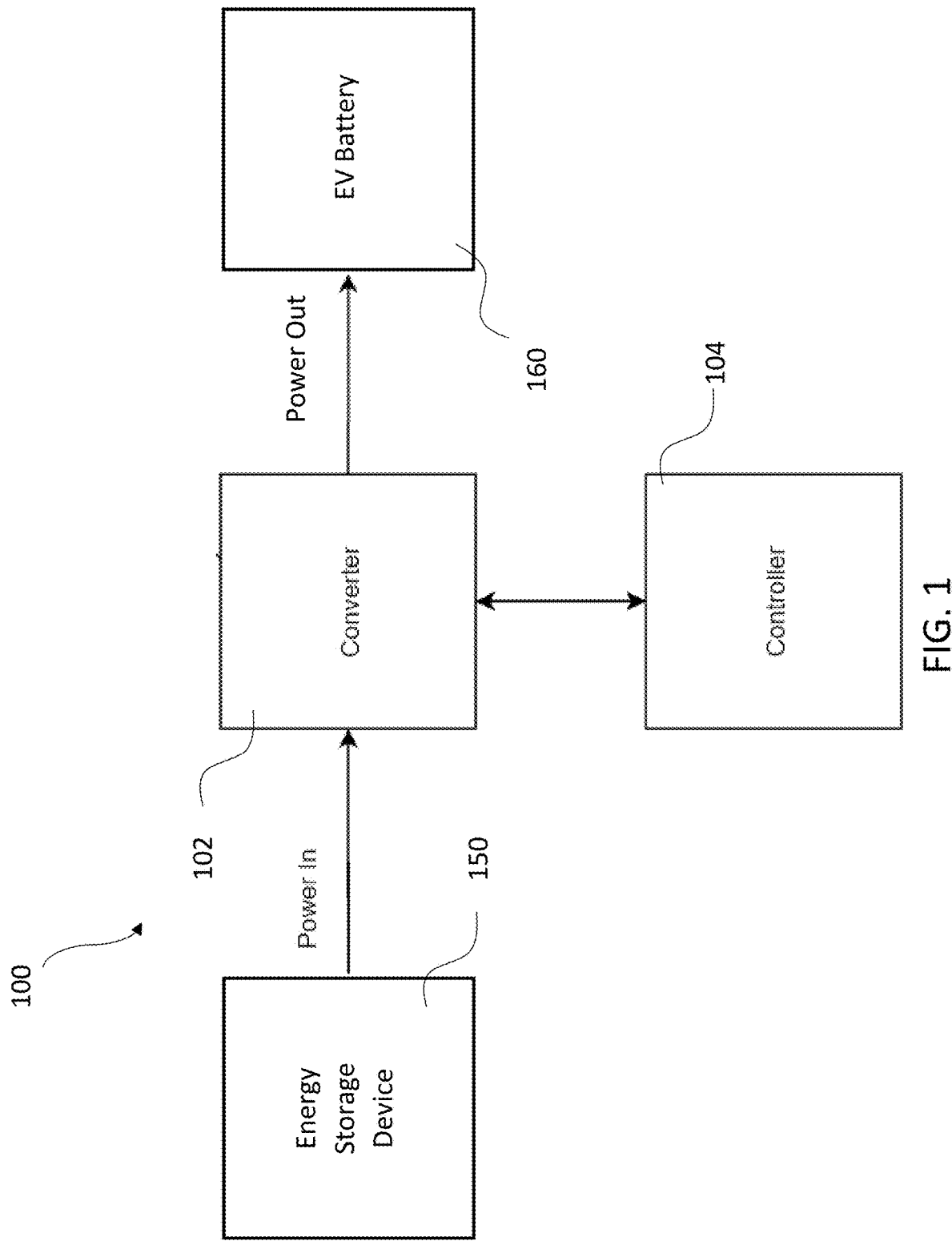
FIG. 1 is a block diagram illustrating an example diagram of a controller and a converter for an EV charging system, in accordance with aspects described herein.

FIG. 1 is a block diagram illustrating an example diagram of a controller 104 and a converter 102 for an EV charging system 100. Converter 102 includes an interleaved DC-DC control system that may be configured to facilitate providing an electric charge to a Power Output, such as an EV battery 160, from a Power Input, such as an energy storage device 150, as described below. Converter 102 may be communicatively coupled to Controller 104, where controller 104 may include components to control the interleaved DC-DC control system of converter 102.

Figure 2:
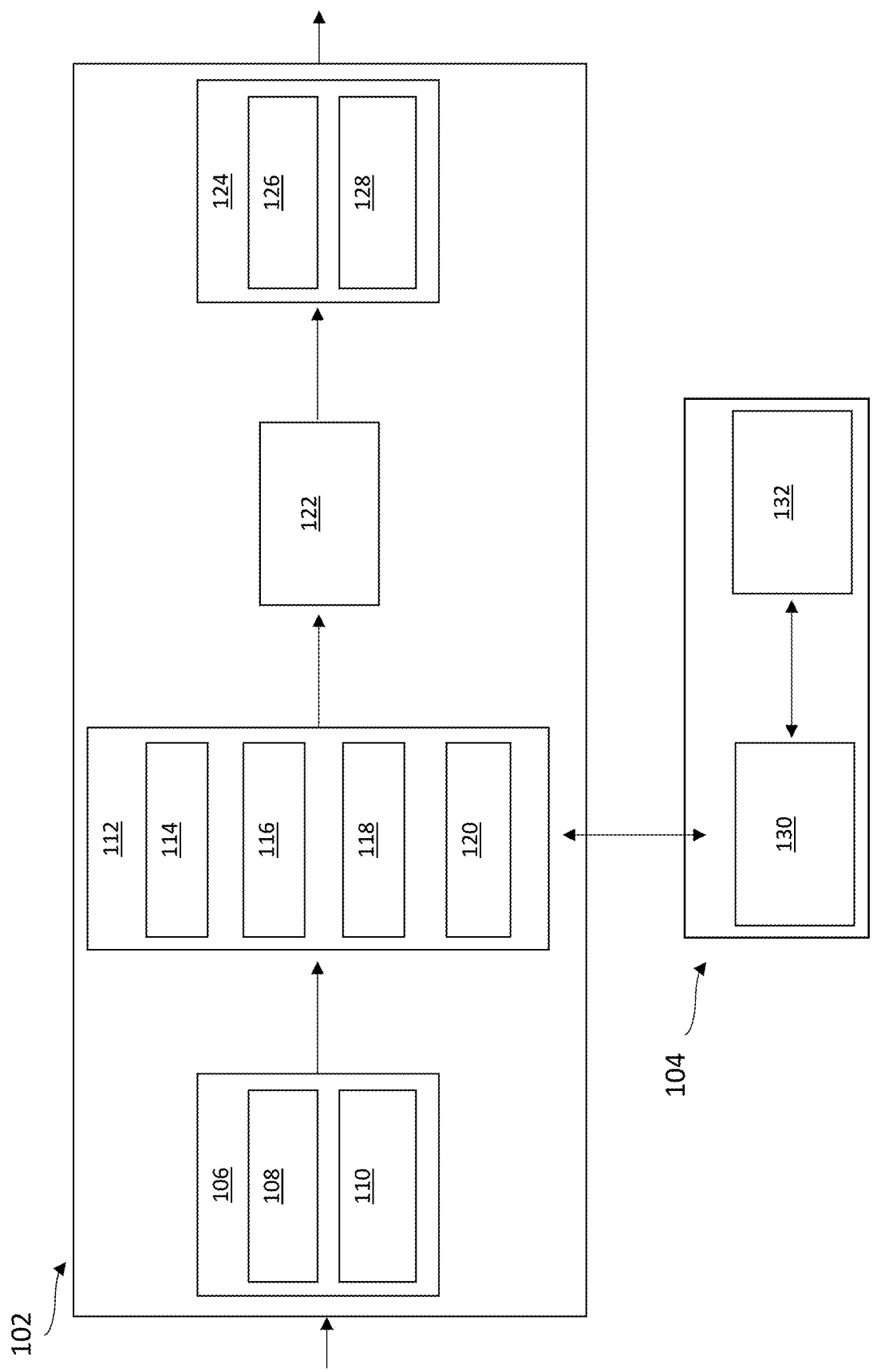
FIG. 2 is a block diagram illustrating example components of the converter and the controller of the EV charging system of FIG. 1, in accordance with aspects described herein.

FIG. 2 is a block diagram illustrating example components of converter 102 and controller 104 of EV charging system 100 of FIG. 1. For instance, converter 102 includes an inrush current limiting circuit 106. Inrush current limiting circuit 106 may include isolated current sensors 108 and high impedance voltage sensors 110, which may ensure that electronic control circuitry 130 of controller 104 is electrically isolated in case of a fault. According to one embodiment, inrush current limiting circuit 106 may ensure that EV charging system 100 charges at a controlled rate when an EV battery is electrically connected to EV charging system 100. Advantageously, inrush current limiting circuit 106 may provide longer life expectancy and safer operation for all power components of EV charging system 100.

According to one embodiment, selectively switchable components of inrush current limiting circuit 106 are configured to receive an electrical power input from an energy storage device. The selectively switchable components may include isolated current sensors 108, which may facilitate high power transfer, and high impedance voltage sensors 110, where both isolated current sensors 108 and high impedance voltage sensors 110 may be controlled by controller 104. Controller 104 may be configured to selectively switch on and switch off various switches of the selectively switchable components when operation of EV charging system 100 is initiated. For instance, switches may be switched off when the current going through the switch has reached a predetermined upper threshold. According to one embodiment, the switching frequency of the switchable components may be fixed. Additionally, high impedance voltage sensors 110 may include a higher impedance path than other switching component(s) of inrush current limiting circuit 106, where the higher impedance path facilitates controlling the charge up time. Isolated current sensors 108 may facilitate quickly isolating the input from the output circuitry in the event of the fault. Additionally, the selectively switchable components that are included in inrush current limiting circuit 106 may reduce the need for there to be an output switching element.

After the electrical power input passes through inrush current limiting circuit 106, the voltage of the electrical power input may be boosted by interleaved boost converters 112 that are communicatively coupled to inrush current limiting circuit 106. In particular, interleaved boost converters 112 may boost an input voltage of the electrical power input to a higher voltage that corresponds to the voltage of the EV battery. According to one embodiment, interleaved boost converters 112 include three parallel boost converters 114, 116, 118 that are each 20 kW in addition to isolated current sensors 120. Each of boost converters 114, 116, 118 are configured to operate in a discrete phase to minimize ripple current in magnetic inductors of interleaved boost converters 112. For instance, electronic control circuitry 130 of controller 104 may set a duty ratio for each boost converter 114, 116, 118 that is offset at 120 degrees.

According to one embodiment, interleaved boost converters 112 may include more than three parallel boost converters 114, 116, 118. For example, interleaved boost converters 112 may include three additional parallel boost converters (not shown) in addition to boost converters 114, 116, 118 such that there is a total of six boost converters. Each of these six boost converters may be configured to operate 60 degrees out of phase of each other. Other embodiments may have more than six boost converters. For instance, the interleaved boost converters 112 may include a total of nine boost converters (not shown) that are configured to operate 40 degrees out of phase of each other.

After the electrical power input passes through interleaved boost converters 112 an electromagnetic interference (EMI) filter 122 may inhibit transfer of noise to the EV battery. After being filtered, the electrical power input passes through unidirectional current circuitry 124 that prevents the EV battery from providing power back (i.e. discharging) into EV charging system 100. Advantageously, unidirectional current circuitry 124 ensures that power is only being provided to the EV battery and does not remove power from the EV battery. Unidirectional current circuitry 124 may also include isolated current sensors 126 and high impedance voltage sensors 128.

Controller 104, which includes electronic control circuitry 130 discussed above, controls the interleaved DC-DC control system of converter 102. Additionally, controller 104 includes vehicle communication circuitry 132 that is configured to establish charging protocols between the interleaved DC-DC control system and the EV battery.

According to one embodiment, EV charging system 100 may include a safety circuit configured to quickly discharge EV charging system 100 due to power failure. The safety circuit may include a resistor and multiple capacitors that are in parallel with the resistor. Additionally, the safety circuit may include an energy storage component that is configured to automatically engage if EV charging system 100 loses power such as, for example, in an emergency shutdown mode. In particular, the safety circuit facilitates running EV charging system 100 without an external load. According to one embodiment, the safety circuit may be turned on and off on command to facilitate with faster shutdowns during normal operations.

According to one embodiment, EV charging system 100 is transportable and includes a multilayered printed circuit board that is stacked on an energy storage device that provides the electric charge. According to one embodiment, the energy storage device includes DC battery modules and the multilayered printed circuit board includes converter 102, which includes the interleaved DC-DC control system, and controller 104.

Figure 3:
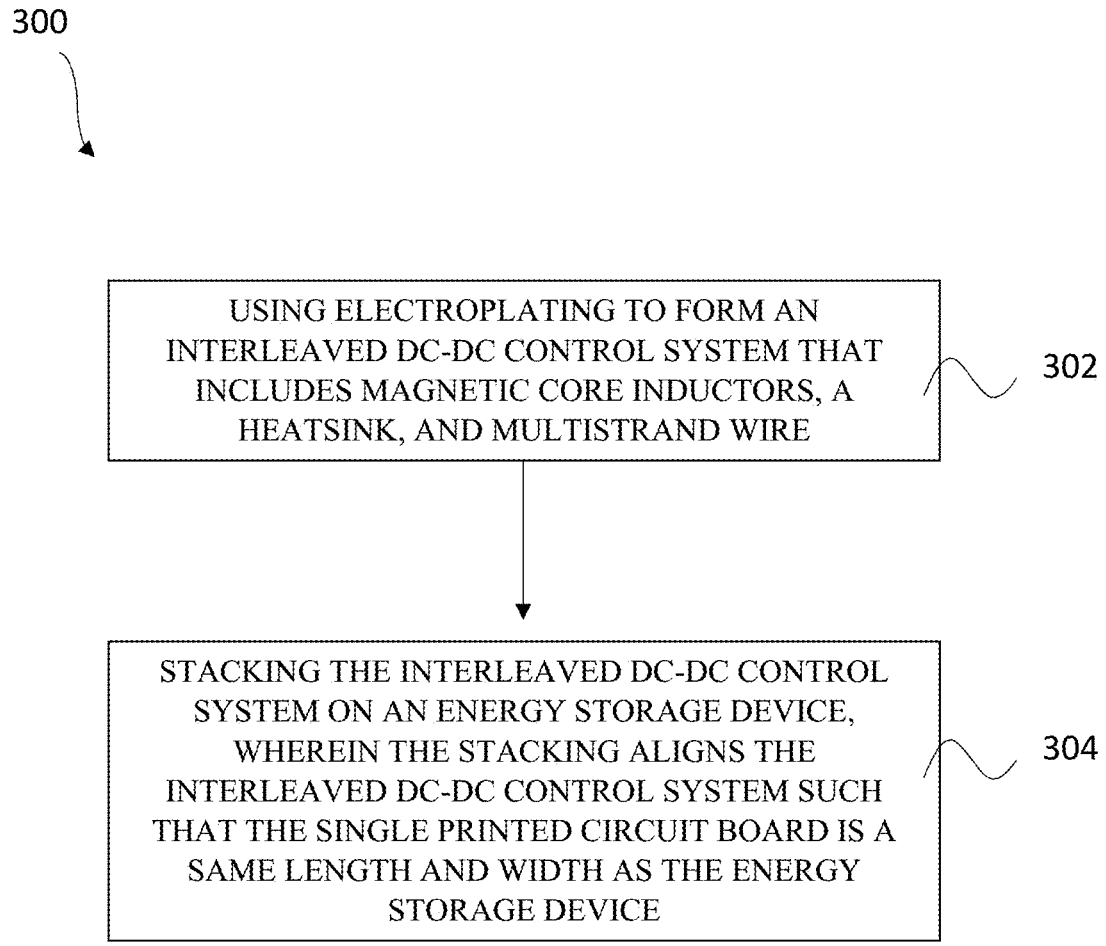
FIG. 3 depicts an example process for manufacturing an electric vehicle charging system, in accordance with aspects described herein.

FIG. 3 depicts an example process 300 for manufacturing an electric vehicle charging system. At block 302, electroplating is used to form an interleaved DC-DC control system that includes magnetic core inductors, heatsink(s), and multistrand wire such as, e.g., Litz wire. The heatsink may include, any passive heat exchanger configured to transfer heat generated by an electronic and/or mechanical device to a fluid medium such as, for example, air or a liquid coolant. According to one embodiment, the heatsink(s) may be cut via an extrusion cut used that is used to obtain a desired size. The electroplating may produce a single printed circuit board that includes three parallel boost converters that are all located on the same circuit board. Advantageously, the combination of the magnetic core inductors and heatsink(s) may provide high power transfer in a small form factor. The interleaved DC-DC control system that is formed by the electroplating may include an inrush limiting circuit as well as an electromagnetic interference filter configured to inhibit transfer of noise to an electric vehicle batter. The interleaved DC-DC control system that is formed may also include unidirectional current circuitry configured to prevent discharge from the electric vehicle battery.

The process 300 also includes, at block 304, stacking the interleaved DC-DC control system on an energy storage device such as, e.g., battery modules. The stacking includes aligning the interleaved DC-DC control system such that the single printed circuit board that includes the three parallel boost converters is a same length and width as the energy storage device. According to one embodiment, the single printed circuit board may be a multilayered printed circuit board upon which the high-power components and the fine pitch components are located. Advantageously, the multiple layers may facilitate current sharing of high current phases. Additionally, the manufacturing process 300 avoids having to place smaller control components on separate boards from the high-power components.

According to various embodiments, the manufacturing process 300 may also include forming a controller that includes electronic control circuitry configured to control the interleaved DC-DC control system and also includes vehicle communication circuitry configured to establish charging protocols between the interleaved DC-DC control system and the electric vehicle battery. The manufacturing process 300 may also include forming a safety circuit configured to discharge the electric vehicle charging system due to power failure. The safety circuit may include a resistor and multiple capacitors, where the multiple capacitors are in parallel with the resistor.

Figure 4:
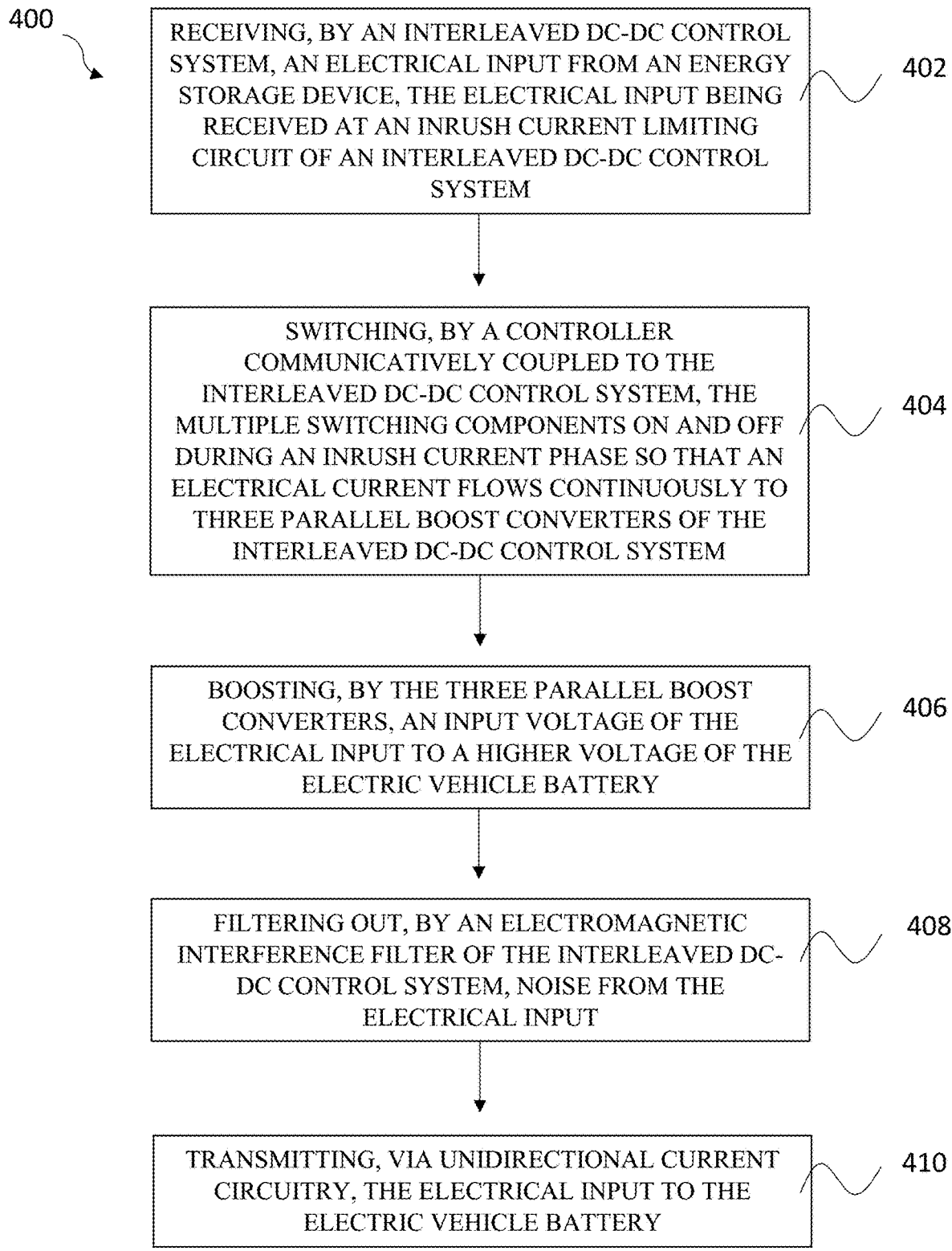
FIG. 4 depicts an example process for charging an electric vehicle battery, in accordance with aspects described herein.

FIG. 4 depicts an example process 400 for charging an electric vehicle battery (e.g. EV battery 160). At block 402 an interleaved DC-DC control system receives an electrical power input from an energy storage device. The electrical power input may be received at an inrush current limiting circuit of the interleaved DC-DC control system, where the inrush current limiting circuit includes multiple switching components. At block 404 a controller communicatively coupled to the interleaved DC-DC control system may switch the multiple switching components on and off during an inrush current phase so that an electrical current flows continuously to three parallel boost converters of the interleaved DC-DC control system. According to one embodiment, one switching component of the multiple switching component includes a higher impedance path than another switching component. At block 406, the three parallel boost converters may boost an input voltage of the electrical power input to a higher voltage of the electric vehicle battery. According to one embodiment, each of the three parallel boost converters may be 20 kW DC-DC converters that operate in discrete phase offsets, where each phase is offset by 120 degrees. The controller may also include converter control circuitry that reads sensor values from current sensors of the three parallel boost converters and based thereon sets a duty ratio for the three parallel boost converters. According to one embodiment, the interleaved DC-DC control system may include more than three parallel boost converters such as, for example, six boost converters, which are offset by 60 degrees, or nine boost converters, which are offset by 40 degrees. At block 408 an electromagnetic interference filter of the interleaved DC-DC control system may filter out noise from the electrical power input. At block 410, the electrical power input may be transmitted, via unidirectional current circuitry, to the electric vehicle battery. For instance, the electric vehicle battery may receive a 50 kW standard charging speed. According to one embodiment, the example process 400 may also include activating, based on detecting a power failure, a safety circuit configured to discharge the electrical power input, wherein the safety circuit includes a resistor in parallel with capacitors.

Although various examples are provided, variations are possible without departing from a spirit of the claimed aspects. For example, systems and methods are described above relating to charging an EV battery. The systems and methods may be used to charge other portable and stationary batteries, such as grid batteries, portable device batteries, and non-vehicle mobile energy storage device applications.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components and/or groups thereof.

The corresponding structures, materials, acts, and equivalents of all means or step plus function elements in the claims below, if any, are intended to include any structure, material, or act for performing the function in combination with other claimed elements as specifically claimed. The description of one or more embodiments has been presented for purposes of illustration and description, but is not intended to be exhaustive or limited to in the form disclosed. Many modifications and variations will be apparent to those of ordinary skill in the art. The embodiment was chosen and described in order to best explain various aspects and the practical application, and to enable others of ordinary skill in the art to understand various embodiments with various modifications as are suited to the particular use contemplated.

What is claimed is:

1. An electric vehicle charging system comprising:
   an interleaved DC-DC control system configured to facilitate providing electric charge to an electric vehicle battery from an energy storage device, the interleaved DC-DC control system comprising:
   a current limiting circuit;
   multiple parallel boost converters, wherein each boost converter of the multiple parallel boost converters is configured to operate in a discrete phase, wherein the multiple parallel boost converters are communicatively coupled to the current limiting circuit; and
   unidirectional current circuitry communicatively coupled to the multiple parallel boost converters; and
   a controller communicatively coupled to the interleaved DC-DC control system, the controller comprising:
   electronic control circuitry configured to control the interleaved DC-DC control system; and
   vehicle communication circuitry configured to establish charging protocols between the interleaved DC-DC control system and the electric vehicle battery, wherein the vehicle communication circuitry is communicatively coupled to the electric control circuitry.

2. The electric vehicle charging system of claim 1, further comprising a safety circuit configured to discharge the electric vehicle charging system due to a power failure, wherein the safety circuit comprises:
a resistor; and
multiple capacitors, wherein the multiple capacitors are in parallel with the resistor.

3. The electric vehicle charging system of claim 2, wherein the safety circuit further comprises an energy storage component, wherein the energy storage component is configured to automatically engage if the electric vehicle charging system loses power.

4. The electric vehicle charging system of claim 1, wherein the current limiting circuit comprises multiple selectively switchable components that are controlled by the controller, at least one switching component of the multiple selectively switchable components including a higher impedance path than at least one other switching component of the multiple selectively switchable components.

5. The electric vehicle charging system of claim 1, wherein the unidirectional current circuitry is configured to prevent discharging from the electric vehicle battery.

6. The electric vehicle charging system of claim 1, wherein the electronic control circuitry is further configured to read sensor values of isolated current sensors of the interleaved DC-DC control system and configured to set a duty ratio for the multiple parallel boost converters, the multiple parallel boost converters including three parallel boost converters configured to operate 120 degrees out of phase of each other.

7. The electric vehicle charging system of claim 1, wherein the interleaved DC-DC control system includes an electromagnetic interference filter configured to inhibit a transfer of noise to the electric vehicle battery.

8. The electric vehicle charging system of claim 1, wherein the interleaved DC-DC control system includes six parallel boost converters, each boost converter of the six boost converters being configured to operate 60 degrees out of phase of each other.

9. The electric vehicle charging system of claim 1, wherein the interleaved DC-DC control system includes nine boost converters, each boost converter of the nine boost converters being configured to operate 40 degrees out of phase of each other.

10. The electric vehicle charging system of claim 1, wherein the electric vehicle charging system is a transportable electric vehicle charging system, the transportable electric vehicle charging system includes a multilayered printed circuit board stacked on the energy storage device, the energy storage device includes DC battery modules, and the multilayered printed circuit board comprises the interleaved DC-DC control system and the controller.

11. The electric vehicle charging system of claim 1, wherein each boost converter includes a 20 kW converter configured to boost an input voltage to a higher voltage of the electric vehicle battery.

12. A method of manufacturing an electric vehicle charging system, the method comprising:
using electroplating to form an interleaved DC-DC control system, configured to facilitate providing electric charge to an electric vehicle battery from an energy storage device, that includes magnetic core inductors, a heatsink, and a multistrand wire, wherein the electroplating produces a single printed circuit board that includes multiple parallel boost converters; and
stacking the interleaved DC-DC control system on the energy storage device, wherein the stacking aligns the interleaved DC-DC control system such that the single printed circuit board aligns with the energy storage device.

13. The method of manufacturing of claim 12, further comprising forming a controller comprising:
electronic control circuitry configured to control the interleaved DC-DC control system; and
vehicle communication circuitry configured to establish charging protocols between the interleaved DC-DC control system and the electric vehicle battery.

14. The method of manufacturing of claim 12, wherein the interleaved DC-DC control system formed by the electroplating further comprises:
an inrush current limiting circuit;
an electromagnetic interference filter configured to inhibit a transfer of noise to the electric vehicle battery; and
unidirectional current circuitry configured to prevent discharging from the electric vehicle battery.

15. The method of manufacturing of claim 12, further comprises forming a safety circuit configured to discharge the electric vehicle charging system due to a power failure, wherein the safety circuit comprises:
a resistor; and
multiple capacitors, wherein the multiple capacitors are in parallel with the resistor.

16. A method of charging an electric vehicle battery, the method comprising:
receiving, by an interleaved DC-DC control system, an electrical power input from an energy storage device, the electrical power input being received at an inrush current limiting circuit of the interleaved DC-DC control system, wherein the inrush current limiting circuit includes multiple switching components;
switching, by a controller communicatively coupled to the interleaved DC-DC control system, the multiple switching components on and off during an inrush current phase so that an electrical current flows continuously to multiple parallel boost converters of the interleaved DC-DC control system;
boosting, by the multiple parallel boost converters, an input voltage of the electrical power input to a higher voltage of the electric vehicle battery; and
transmitting, via unidirectional current circuitry, the electrical power input to the electric vehicle battery.

17. The method of claim 16, wherein each boost convert of the multiple parallel boost converters operate in discrete phase offsets.

18. The method of claim 16, further comprises activating, based on detecting a power failure, a safety circuit configured to discharge the electrical power input, wherein the safety circuit comprises a resistor in parallel with capacitors.

19. The method of claim 16, wherein one switching component of the multiple switching components comprises a higher impedance path than another switching component of the multiple switching components.

20. The method of claim 16, wherein converter control circuitry of the controller reads sensor values from current sensors of the multiple parallel boost converters and based thereon sets a duty ratio for the multiple parallel boost converters.

* * * * *